(12) United States Patent
Caceres et al.

(10) Patent No.: US 8,542,909 B2
(45) Date of Patent: Sep. 24, 2013

(54) METHOD AND APPARATUS FOR MEASURING AN AUDIOVISUAL PARAMETER

(75) Inventors: Antoni Caceres, Cambridge (GB); Martin Norman, Cambridge (GB)

(73) Assignee: Tektronix, Inc., Beaverton, OR (US)

( * ) Notice: Subject to any disclaimer, the term of this patent is extended or adjusted under 35 U.S.C. 154(b) by 306 days.

(21) Appl. No.: 13/081,395

(22) Filed: Apr. 6, 2011

(65) Prior Publication Data

US 2011/0249888 A1 Oct. 13, 2011

(30) Foreign Application Priority Data

Apr. 9, 2010 (GB) .................................. 1005973.1

(51) Int. Cl.
*G06K 9/00* (2006.01)
(52) U.S. Cl.
USPC ........... 382/154; 382/224; 382/103; 382/153; 382/164; 382/173; 382/181; 382/190; 382/201; 382/218; 382/285; 382/291
(58) Field of Classification Search
CPC ....... G06T 7/0075; G06T 15/00; G06T 19/20; G06T 2207/10028; G06K 9/46
USPC ................ 382/154, 224, 103, 153, 164, 173, 382/181, 190, 201, 218, 285, 291
See application file for complete search history.

(56) References Cited

U.S. PATENT DOCUMENTS

| | | | |
|---|---|---|---|
| 2003/0007680 A1* | 1/2003 | Iijima et al. .................... | 382/154 |
| 2007/0047040 A1 | 3/2007 | Ha | |
| 2007/0286476 A1 | 12/2007 | Kim et al. | |

OTHER PUBLICATIONS

Crouzil A et al: "A new correlation criterion based on gradient fields similarity", Proceedings of the International Conference on Pattern Recognition, 1996, pp. 632-636, XP002419454.

Kim, D. et al: "Depth map quality metric for three-dimensional video", Proceedings of SPIE, vol. 7237, Feb. 12, 2009, pp. 723719-1, XP002656953, ISSN: 0277-786X, DOI: 10.1117/12.806898.

Zilly, F. et al: "Real-Time Analysis and Correlation of Stereoscopic HDTV Sequences", 6th European Conference on Visual Media Production (CVMP 2009), London, UK, Nov. 1, 2009, pp. 1-1, XP055060349, Retrieved from the Internet: URL:http://www.hhi.fraunhofer.de/fileadmin/user_upload/Departments/Image_Processing/Applications/Stan_Stereoscopic_Analyzer/stan_short_paper.pdf.

Kauff, P et al: "Stereoscopic Analyzer (STAN)", FKT Fernseh Und Kinotechnik, Fachverlag Schiele & Schon GmbH., Berlin, DE, vol. 64, No. 4, Apr. 1, 2010, pp. 178-184, XP001555938, ISSN: 1430-9947.

Kishi, S. et al: "Stereoscopic camera system with creator-friendly functions", Proceedings of SPIE, vol. 7237, Feb. 5, 2009, pp. 72371M-72371M-9, XP055060302, ISSN: 0277-786X, DOI: 10.1117/12.807245.

Kawai, T. et al: "Ergonomic evaluation system for stereoscopic video production", Proceedings of SPIE, vol. 6055, Feb. 2, 2006, pp. 60551B-60551B-8, XP055060295, ISSN: 0277-786X, DOI: 10.1117/12.647329.

(Continued)

*Primary Examiner* — Mike Rahmjoo
(74) *Attorney, Agent, or Firm* — Michael A. Nelson; Marger Johnson & McCollom PC (57) ABSTRACT

There is provided a method of measuring 3D depth of a stereoscopic image, comprising providing left and right eye input images, applying an edge extraction filter to each of the left and right eye input images, and determining 3D depth of the stereoscopic image using the edge extracted left and right eye images. There is also provided an apparatus for carrying out the method of measuring 3D depth of a stereoscopic image.

12 Claims, 8 Drawing Sheets

(56) References Cited

OTHER PUBLICATIONS

"Anabuilder: Viewing with border detection (and other kind of viewing) for better adjustment", Aug. 19, 2009, pp. 1-1, XP055060289, http://web.archive.org and http://anabuilder.free.fr/welcome.html URL: http://web.archive.org/web/20081113035042/http://anabuilder.free.fr/welcome.html and for overlaid edges: http://web.archive.org/web/20090819091835/http://anabuilder.free.fr/ScreenSlides/HTML/Border.html.

Dubbelman, G. et al: "Obstacle detection during day and night conditions using stereo vision", Intelligent Robots and Systems, 2007, IROS 2007, IEEE/RSJ International Conference On, IEEE, Piscataway, NJ., USA, Oct. 29. 2007, pp. 109-116, XP031222054, ISBN: 978-1-4244-0911-2.

European Search Report for Application No. 11161740.3, dated May 3, 2013, 14 pages.

* cited by examiner

METHOD AND APPARATUS FOR MEASURING AN AUDIOVISUAL PARAMETER

TECHNICAL FIELD

The invention is related to audiovisual data stream testing in general, and in particular to a method and apparatus for measuring the extent of 3D visual depth in a stereoscopic video stream.

BACKGROUND

Stereoscopic (i.e. 3D) images and video work by presenting two separate and slightly different images to the left and right eyes respectively. The images are different, because they are each to emulate what a viewer of a particular scene would see from their left and right eyes respectively, which are spaced apart by approximately 10 cm. It is this change of viewing angle between the eyes that allows humans (and other forward facing eyed animals, which are predominantly predators) to perceive depth through what is known as parallax.

Stereoscopic media only works if the left and right eyes view their respective images separately (i.e. the right eye cannot see any of the left eye's image, and vice versa) and at the same time.

There are a number of different technologies available to enable this separated but simultaneous display, including anaglyph (i.e. using two different and chromatically opposite colour filters), passive polarised (i.e. using 90 degree apart, typically horizontally and vertically, polarised filters) and active shutter (which obscures the left then right eye alternately). For the first two methods, both left and right eye images are shown at the same time, but using the respective colour or polarisation filters to remove the opposite eye's image from view, so that each eye only sees the correct image. Whereas, the active shutter method links actively controlled glasses to the display, so that the glasses blank off the left or right eye alternately according to which image is shown on screen. Thus, in this active shutter method, only one out of the left or right eye image is shown at any one time, and the human brain is relied upon to merge the alternating display into a single image (much like 24 frames/second film is perceived as full motion).

To account for the separate left and right eye imagery, stereoscopic images or video can be encoded in a variety of different ways. For example, a stereoscopic video may be encoded "sequentially", i.e. as a stream of sequential images, alternating between display for the left and right eyes (which can be processed into a single "dual" image using filters). Equally, the stream of stereoscopic images may be encoded "side-by-side", i.e. a stream of images containing both the Left and Right eye images, which can be subsequently processed to separate out the images into streams for display to the left and right eyes respectively.

Regardless of the encoding method, a viewer watching 3D images with passive or active 3D glasses will see two different images, one in left eye and another in right eye. This is achieved by using polarized light/colour filters in the case of passive glasses, or active shutter in the active glasses which need to be synchronized with the device displaying the 3D video.

Since 3D imagery is emulating what humans can see in real life, visualizing 3D images requires the use of not only glasses, but also an appropriate distance to the display screen. If the distance is not correct, or the encoded depth of image is not correct, the image can appear unnatural, and hence cause eye strain.

Currently, it is difficult to objectively determine whether 3D content is present in a video stream, that it is natural looking, or that it is correctly encoded. The present invention described in this document therefore presents a method and apparatus for visualizing and analysing the depth aspect of the 3D video/images.

SUMMARY

Accordingly, there is provided a method of measuring 3D depth of a stereoscopic image, comprising providing left and right eye input images, applying an edge extraction filter to each of the left and right eye input images, and determining 3D depth of the stereoscopic image using the edge extracted left and right eye images. The described method and apparatus provides a means to estimate the extent of perceived 3D visual depth (i.e. parallax) in a stereoscopic image or video and visualise/illustrate the estimated depth in a selection of different 2D displays, for ease of interpretation.

Optionally, the edge extraction filters are colour coded, and the method further comprises superimposing colour coded edge extracted left and right eye images onto a single screen for display to a user.

Optionally, the edge extraction filters are applied to the luminance component of each pixel in the left and right eye images.

Optionally, the method further comprises determining a parallax value indicative of a 3D depth for each pixel in a stereoscopic image.

Optionally, determining a parallax value comprises selecting a kernel of pixels for comparison in a one of the left or right eye edge extracted images, determining a most similar selection of pixels in another one of the left or right eye edge extracted images, and providing a separation value between the relative positions of the selected kernel from one eye edge extracted image to the other eye edge extracted image.

Optionally, determining a most similar selection comprises correlating the selected kernel of pixels from a one of the left eye edge extracted image or the right eye edge extracted image, with a range of pixels from the other one of the left or right eye edge extracted images.

Optionally, the correlation uses an inverse of a sum of absolute differences between pixels of the left or right eye edge extracted images.

Optionally, the range of pixels from the other one of the left or right eye edge extracted images comprises a search window, said search window having a height equivalent to the kernel of pixels height and a user-defined length, or having a user-defined height greater than the kernel of pixels height and a user-defined length. Using a search window have additional height compared to the kernel of pixels allows any vertical misalignment of the lenses to be detected and corrected.

Optionally, determining a most similar selection further comprises selecting a compared position using a sufficient peak magnitude to indicate a likely match. The estimated parallax value can then be added to a parallax distribution list for the image.

Optionally, if a sufficient peak magnitude is not found, then a parallax value is omitted for the pixel under test.

Optionally, the method further comprises determining if any determined parallax value exceeds a user defined positive or negative threshold.

Optionally, the method further comprises applying at least one colour according to an amount of parallax attributed to a pixel, and displaying a colour coded greyscale version of the stereoscopic image to show parallax distribution across the stereoscopic image.

There is also provided apparatus for measuring 3D depth of a stereoscopic image, comprising an input for receiving a stereoscopic image, at least one edge extraction filter to filter left and right eye portions of the stereoscopic image and processing means to carry out any of the described methods.

Optionally, the apparatus further comprises a parallax estimation unit and a comparison/correlation unit.

There is also provided operational monitoring equipment for use in television broadcast system testing (or other audio-visual test apparatus) comprising the described apparatus There is also provided a method of visually displaying the amount of separation in a 3D image comprising applying a colour coded edge filter to the luminance component of the left and right eye images of a stereoscopic image and then superimposing the resulting two images on a single display.

There is also provided a method of displaying the relative depths of objects in a 3D image comprising using colour to represent depth in a monochrome version of the image, wherein an edge detection filter is applied to the luminance component of either the left or right eye image, wherein the colour applied to each edge shall represent its relative depth in the image. For example, red may be used for objects appearing out of the screen (i.e. negative parallax), fading to white for zero parallax, and moving through to blue for objects appearing in the distance (i.e. positive parallax).

There is also provided a method of providing a Parallax Distribution histogram may be plotted displaying the proportion of parallax used across an entire image. This is achieved by plotting the parallax of each pixel. Alarm limits may be applied at user defined parallax levels to drive monitoring equipment.

All of the proposed methods and apparatus are independent of the method used to transmit the left and right eye images, such as anaglyph or side-by-eye. Therefore the methods and apparatuses apply to any 3D transmission method where there is a known synchronization between the left and right eye images.

BRIEF DESCRIPTION OF THE DRAWINGS

A method and apparatus for measuring 3D depth in a stereoscopic image will now be described, by way of example only, and with reference to the accompanying drawings in which.

DETAILED DESCRIPTION

An embodiment of the invention will now be described with reference to the accompanying drawings in which the same or similar parts or steps have been given the same or similar reference numerals.

Edge Detection on Left Eye Frame and Right Eye Frame

The first step of the method for analysing 3D depth of a stereoscopic video according to an embodiment of the present invention is to apply an edge detection filter to the two input frames (left eye and right eye frames respectively). The edge detection filter typically works with the luminance component of the pixels making up the image, and is achieved by applying a separable convolution filter to the two input frames. There are various edge detection filters available that are suitable for the process, for example the Sobel, Prewitt, and Kirsch edge filters, amongst others. The performance of each type of filter is likely to be image content dependent. That is, for example, one filter may be better at content having humans and animals, whereas another filter may be better for landscapes, etc. For example, empirical testing has shown the Sobel filter to be particularly effective for video having objects in the foreground. Edge detection may also be known as edge extraction.

Figure 1:
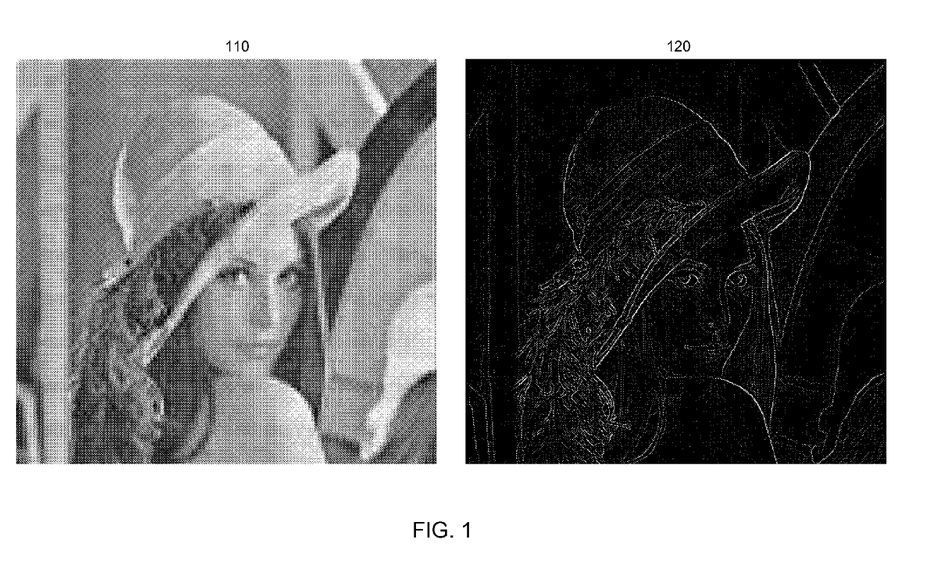
FIG. 1 shows an original image and the same image with an edge extraction filter applied according to an embodiment of the present invention.

FIG. 1 shows an example of an original image 110 and the image 120 resulting from applying an edge extraction filter to the original image 110. It can be seen that the edge extracted images are predominantly black/dark, with only the extracted edges exhibiting any significant luminance values.

Dual Edge Display

Once an edge extraction of the two left/right eye input frames has been produced, the two edge extracted input frames may be displayed using different colours for each eye (e.g. green for left eye and blue for right eye or red and blue for left and right respectively—the choice of the colours used here does not have anything to do with the anaglyph choice of colours, and are just chosen to be visually contrasted, hence discernable without glasses) and superimposed together to show in the same display. This allows the easy visual identification (by a user of test equipment adapted according to the described method and apparatus) of whether there is any 3D effect in the sampled image(s), and also visually indicates which objects have negative parallax and positive parallax, as described in more detail below.

Figure 2:
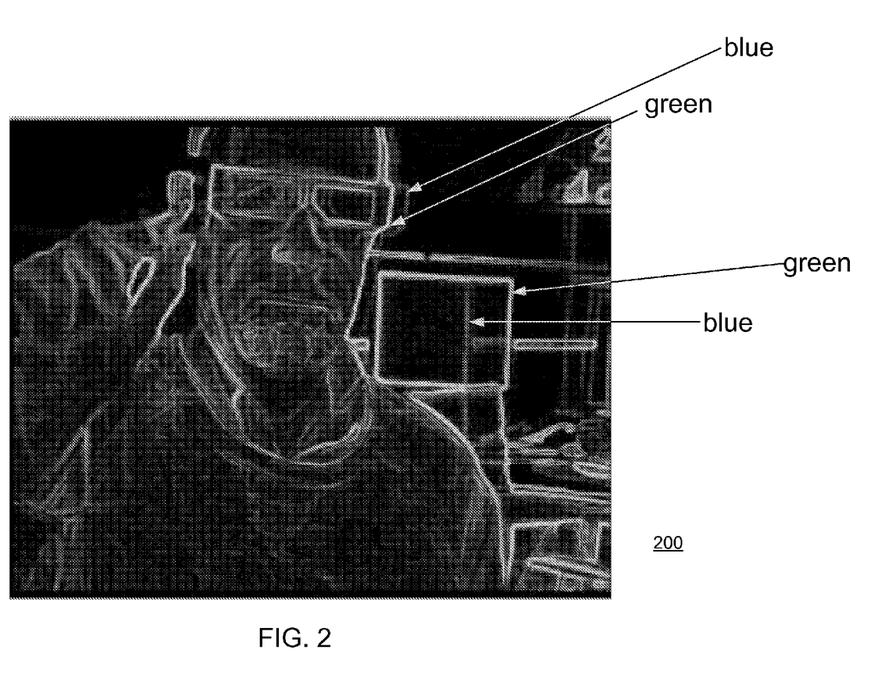
FIG. 2 shows left and right eye edge extracted images superimposed in to a single image according to an embodiment of the present invention.

FIG. 2 shows an example of a superimposed edge extracted display image 200, processed as described above. Whilst it is easy for a human to subjectively deduce where items within the image should be, depth-wise, according to the content, a machine needs an objective test, and moreover, a user may require measurable parameters.

The depth may be tested objectively, as follows. From the image in FIG. 2, it can be deduced that the face and glasses of the person in the image has negative parallax (i.e. appears 'out of the screen'), whilst the computer monitor in the background has positive parallax (i.e. appears 'into the screen'). This is because it can be seen that the green edge is to the left of the blue edge for the glasses/face, whereas the green edge is to the right of a corresponding blue edge for the computer monitor.

In each case, the distance in pixels between the two coloured lines for the same feature corresponds to the perceived depth of the object (i.e. parallax).

Accordingly, the relative horizontal distance between the same features within the left and right eye edge extracted images is a measure of the image separation and directly relates to how natural the 3D image will appear to viewers. Significant levels of separation will make the viewer feel uncomfortable or even nauseous. It is likely that broadcasters and standards bodies will place restrictions on acceptable levels of image separation for 3D video/image material.

Parallax Estimation

After computing the edge extracted frames for both left and right eyes, the parallax for each pixel is estimated by comparing the two left and right eye edge extracted images with each other, using correlation.

An exemplary small scale correlation will now be described. However, the invention is not limited to only the described small scale correlation.

For a pixel P, with screen coordinates (X,Y) in the left eye edge extracted image, a kernel of pixels centred on pixel P is built. An example of such kernel, in the form of a 3×3 matrix, is shown below. It details the coordinates of pixels included in the kernel (if pixel with coordinates X,Y is the pixel being evaluated—i.e. the pixel under test):

| X − 1, Y − 1 | X, Y − 1 | X + 1, Y − 1 |
| X − 1, Y     | X, Y     | X + 1, Y     |
| X − 1, Y + 1 | X, Y + 1 | X + 1, Y + 1 |

Other kernel sizes may be used. For simplicity, the pixels at the very edge of the images can be ignored, since there will not be a full kernel available for them. Besides, these edge portions are not likely to be of particular importance, as they are not the focus of a viewer's attention. The kernel is correlated (i.e. the similarity between the two is assessed) against a user selected search window, M by N, in the other eye image. Since the left and right eye images are assumed spatially aligned, for ease, the comparison is between a kernel from the left eye edge extracted image, with a search window in the right eye edge extracted image. Of course, the correlation calculation can be carried out the other way round (i.e. the kernel from the right eye edge extracted image, and the search window from left eye edge extracted image).

The height of the search window (N) is typically determined by the height of the sample kernel. This is because the correlation is typically only carried out in the horizontal (sideways) directions (i.e. to left or right), since the stereoscopic effect only operates in the horizontal direction. Whereas, the length of the search window (M) is user specific, according to the parameters of the input image/video material and desired performance characteristics. In one example, the search window may be +/−100 pixels, but other search window sizes may equally be used. Increasing the search window size vs the kernel increases correlation time, and may provide improved accuracy. However, on the other hand, since the parallax is not expected to be too large, a smaller search window should suffice.

In a more advance embodiment, the search window may be greater in height than the kernel, so that the correlation searches in the vertical plane to some degree also. This allows the detection and correction of any vertical misalignment between the two lenses forming the 3D camera, either automatically (in the case of a camera having motorised lens movement mechanics), or via notification to a cameraman, for him to adjust the lens manually. Alternatively, in the case where the 3D imagery is already shot, and hence the lens cannot be adjusted, the detection of the amount of vertical misalignment can allow for post processing of one of the two image sets to re-align the image streams by shifting one of the image streams up or down to compensate. This might save what would otherwise be classed as unusable 3D video/image content (it would be effectively slightly 'blurred').

The maximum offset is typically determined by image size and maximum allowable parallax.

The correlation of two kernels is defined, in this example, as the inverse of the sum of the absolute value of the differences between pixels. Thus, in this case, if Left and Right are the two kernels being correlated, the correlation index is:

$$\text{Correlation}(\text{Left},\text{Right}) = 1/\Sigma[\text{Left}(i,j) - \text{Right}(i,j)]$$

Where I, j are the coordinates of the pixels in use.

However, other forms of correlation may be used such as the Shift-Invariant pattern matching algorithm.

In this simplistic example, the pixel being looked at (i.e. the pixel of interest) is part of a top left to bottom right diagonal line in the left eye edge extracted frame.

Constructing the 3×3 kernel of pixels, which includes the given pixel and its neighbouring pixels, results in the following matrix:

| 150 | 0   | 0   |
| 0   | 200 | 0   |
| 0   | 0   | 225 |

These are 'strength of edge' values, i.e. luminance values in an edge extracted version of the image. Noting that in an edge extracted image, only the edges have luminance values, with the remaining portions being close to, or at, zero.

Now, if the same three rows of pixels in the right eye frame had the following values (the example only being a very small picture—3 high×7 wide pixels):

| 200 | 200 | 200 | 0 | 145 | 0   | 0   |
| 200 | 200 | 200 | 0 | 0   | 225 | 0   |
| 200 | 200 | 200 | 0 | 0   | 0   | 250 |

Then, when trying to correlate the left eye kernel with these three rows, we find that the best match is the last position, i.e. on the far right hand side. This is because is exhibits a very similar set of values in the same diagonal line formation. In this case, the kernel is best placed four pixels to the right of its initial starting point. Therefore the offset, and hence parallax, is a right offset of 4, i.e. +4.

Figure 3:
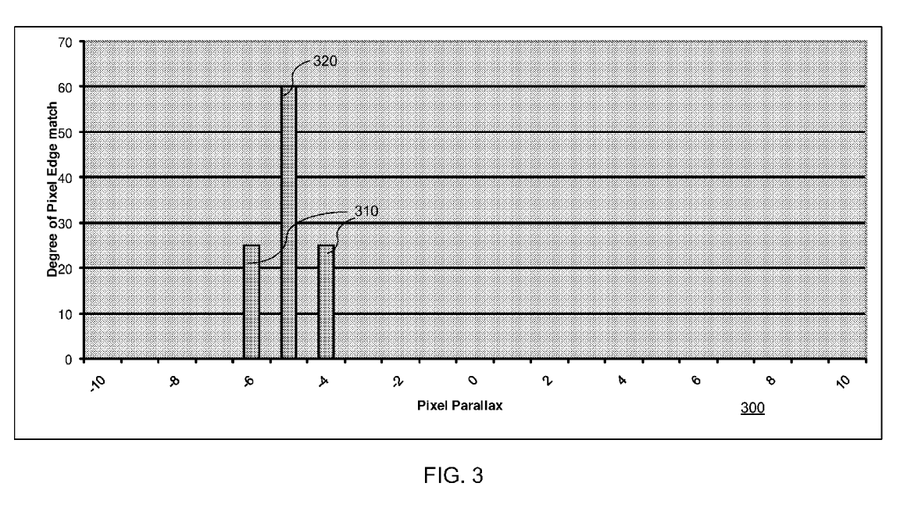
FIG. 3 shows a sample distribution for parallax estimates for a selected single pixel according to an embodiment of the present invention.

After calculating the correlation index of the kernel in the left eye edge extracted frame with the search window in the right eye edge extracted frame for different offsets, we obtain a correlation graph (with normalized values), such as shown in FIG. 3.

If a single peak of sufficient magnitude is found, it is determined that the parallax at that pixel can be estimated and this estimation value is added to the parallax distribution list. What constitutes a 'sufficient magnitude' varies according to the set up parameters. As it stands, the above correlation equation can produce a magnitude that may vary between 0 and infinity (where there is an exact match, the denominator is 0). However, practical realisations may normalise the values (e.g. to 100), in order to make the calculations quicker and more efficient on processing hardware. In this case, the sufficient magnitude may be considered to be anything above 60%, for example.

The exact thresholds used may be adapted if insufficient results are found during a first pass. For example, if, upon a first pass of the image no suitable matches are found, the level set for the sufficient magnitude may be reduced to ensure some pixels are considered to have sufficient magnitude.

Occasionally, where the image quality is poor or the image content yields multiple possible matches due to repetitive content (such as a check shirt), it may not be possible to estimate the parallax for an individual pixel, so no value is added to the distribution list for that pixel. Also, the user may wish to adjust the magnitude threshold depending upon the content material being analysed.

The use of averaging, or other spurious result rejection schemes, may be employed For example, the estimated pixel parallax for a pixel could be compared with adjacent pixels' parallax, and if there was a significant and unexpected result (e.g. a −5 amongst all positives), then the spurious result could be ignored, or amended with a parallax value based on the average of a particular local grouping.

In FIG. 3, which shows a sample distribution of parallax estimates for a single pixel 300, P, there are a set of three potential parallax values obtained—two lower peaks 310, at −4 and −6 respectively, and a clear peak magnitude 320 at −5. This value is therefore assumed to be the most likely value for the parallax, and is hence added to the parallax distribution list.

The same process is carried out for each pixel in the left eye edge extracted image, except for the extreme edges.

Temperature Display

Once an as complete as possible parallax distribution list is obtained, the estimated parallax for each pixel may then be plotted on a display showing the overall parallax for the whole image. This is referred to as a 'temperature' display, where each pixel that corresponds to an edge in the image is coloured according to its estimated parallax.

Objects which are out the camera (i.e. have negative estimated parallax) will be considered 'hot' and displayed in red colour. Whereas, objects into the camera (i.e. have positive estimated parallax) will be considered 'cold' and displayed in blue colour. Objects with zero parallax will be white. Of course, other colours may be used, and these colours have no connection with the colours used for anaglyph 3D image presentation. Nor are these colours related to the Blue/Green colours discussed previously with respect to the edge extracted images (again these are arbitrary choices of colour to make it clear what is happening when the data is displayed to a user).

Figure 4:
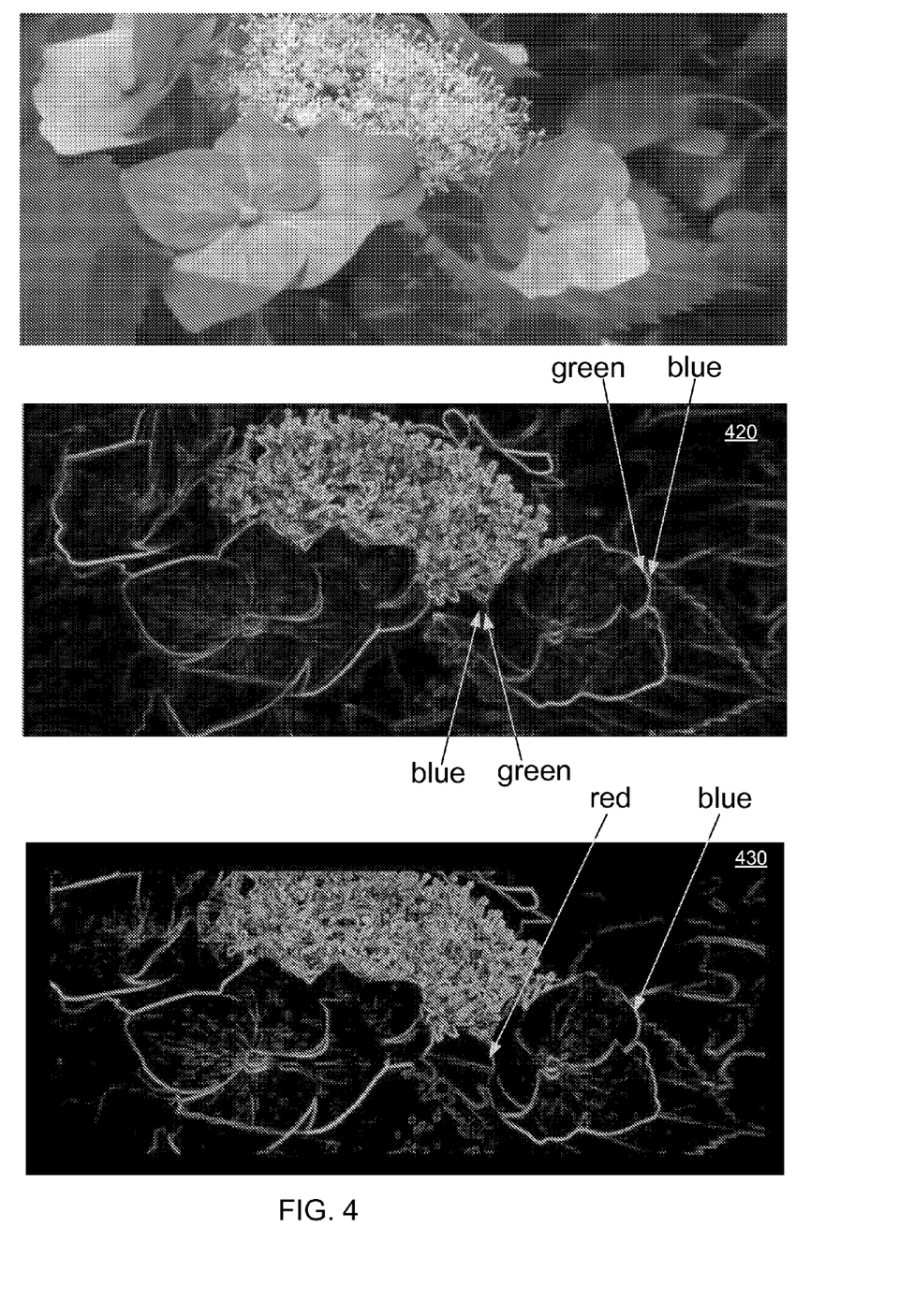
FIG. 4 shows an original image, the superimposed left/right eye edge extracted version and a temperature display for displaying relative depth of a stereoscopic image according to an embodiment of the present invention.

FIG. 4 shows a set of images for all three above described processes. An original image 410, its superimposed Left/Right edge extracted version 420, and the final temperature display version 430. In this example, no temperature is plotted for pixels where the parallax could not be estimated. It would be straightforward to plot these pixels in another colour to highlight the extent to which parallax estimates have been possible.

In the temperature display 430 of FIG. 4, it can be seen that the bottom right hand purple flower is half red and half blue, showing ti has both positive and negative parallax portions (some of it is coming out of the screen, and some is going into the screen).

As mentioned previously, if insufficient pixels are shown to have an estimated parallax value, then the thresholds for the 'sufficient magnitudes' can be adjusted to allow more pixels to be estimated. Equally, if there are too many parallax estimates, the thresholds can be reduced.

Such a temperature display, preferably shown in a live real-time feed form, allows content creators and broadcasters to verify the relative depth of objects used in the 3D image/video they are (or intend) to broadcast using a simple 2D display, which is much easier to interpret. The key to this display is replacing the chroma content of the original image with information representing relative depth, represented by different colours (e.g. red and blue). It may be possible to increase the display utility by using a scale of hues of the selected colours. For example, in the above described red/blue colour scheme, a dark blue may represent extreme 3D depth, whilst a light blue represents only minor 3D depth. The same goes for saturated and unsaturated red (but in the opposite direction).

Parallax Distribution

Now that a measure of 3D depth (i.e. parallax) is available for each pixel in a stereoscopic image, it may be beneficial to use this to determine whether the 3D image/video contains any 3D effect that is likely to cause a typical viewer discomfort or nausea. For example, this might help ensure that any 3D video to be broadcast is within the standard limits for 3D depth set by relevant governing bodies. If any such offending material is found, it can be amended so that it is no longer outside of the boundaries, or excluded from use.

To do this, the pixels for which a single peak of sufficient magnitude could be found may then be plotted in a histogram. The histogram uses the estimated parallax values in the x-axis and the number of pixels found with that level of parallax in the y-axis.

Figure 5:
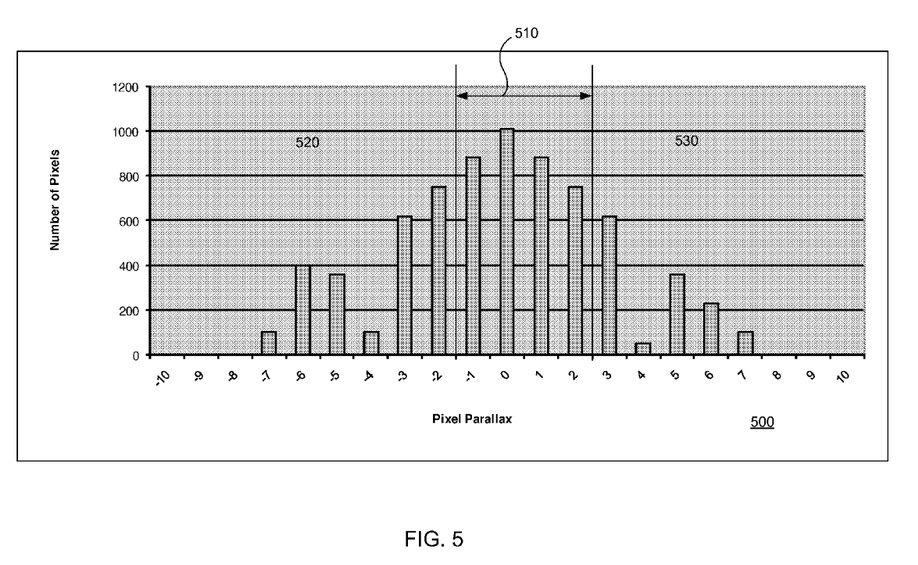
FIG. 5 shows a parallax distribution graph for a whole image according to an embodiment of the present invention.

FIG. 5 shows an example histogram 500 where 1010 pixels contained zero parallax (which means that the maximum correlation was found at 0 offset between the left eye frame and the right eye frame). Negative parallax values indicate the proportion of the image that is coming out of the screen as compared with positive values that indicate the proportion of the image in the distance (i.e. into the screen).

The x axis may be adjusted and relabelled instead to indicate percentage of disparity or separation. This is simply the degree of parallax as a proportion of the horizontal image size. For example, if there is a 5 pixel separation between the left eye edge extracted frame and the right eye edge extracted frame, in an image that is 200 pixel wide, then the parallax could be calculated to be −2.5% instead of −5.

There are likely to be bounds placed upon the amount of parallax allowed to be used in 3D stereoscopic images/videos, so as not to make viewers feel uncomfortable, nauseous or worse. These limits are yet to be defined, but figures in the order of up to 1% negative and 2% positive can be envisaged.

Accordingly, to allow content creators and distributors to know if their 3D material is within the accepted bounds, it may be useful to apply corresponding user-specified vertical thresholds of positive and negative parallax to the Parallax Distribution histogram. In FIG. 5, there can be seen a central "within bounds" portion 510, where the parallax is acceptable, and a left hand side "too negative" portion, 520, and a right hand side "too positive" portion, 530.

If the stereoscopic image/video under test exhibits parallax values outside of the central allowed portion 510 (as is the case in FIG. 5), then an alarm may be triggered in the 3D stereoscopic depth monitoring equipment according to the present invention. Such a method and apparatus not only allows for unattended operation, but is also less error prone than checking 3D content using humans (with 3D glasses) alone.

Figure 6:
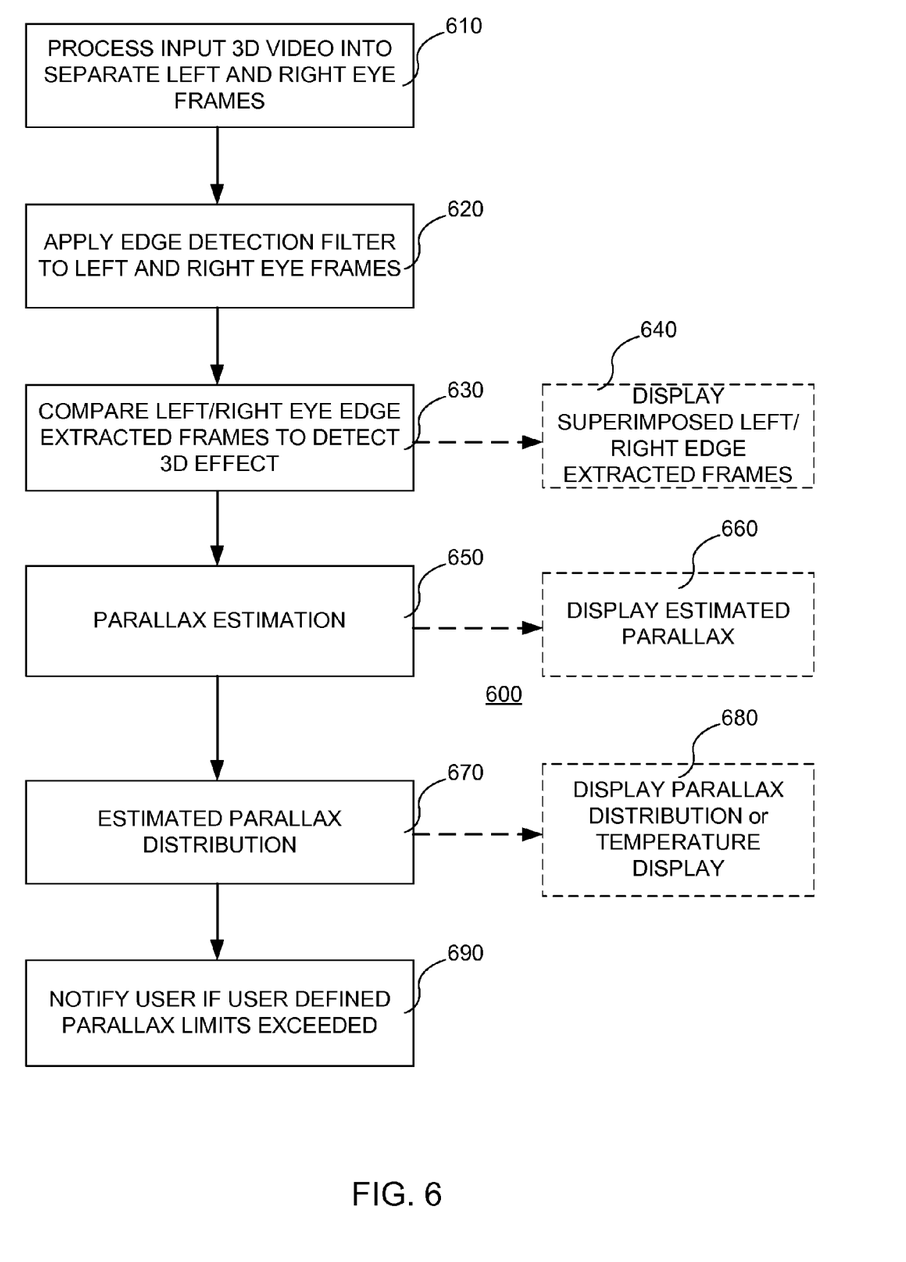
FIG. 6 shows a high level flow chart of the method of analysing 3D of a stereoscopic video according to an embodiment of the present invention.

FIG. 6 shows a high level flow chart of the above described method 600 of analysing 3D depth of a stereoscopic image/video.

The method starts at step 610 by processing an input 3D video into respective left and right eye images. This may involve, for example, de-interleaving a 'sequential' 3D video stream, or slicing a 'side by side' video stream into respective left and right eye portions.

Next, an edge detection/extraction filter is applied to each left and right image under test at step 620. Suitable edge extraction filters include the Sobel, Prewitt, and Kirsch edge filters.

Then, the left and right edge extracted images are correlated together to determine what portions of the respective original image have 3D depth at step 630. In its simplest, this involves superimposing the two edge extracted images (each being a greyscale version, but in a different colour to one another) on top of each other and displaying the result to a user at step 640. The user may then visually determine which portions have 3D depth, and whether those portions will appear coming out in the foreground or going into the distance, according to which way round the lines for each eye are displayed relative to one another, as described in more detail above.

Displaying step 640 (and displaying steps 660 and 680) are shown in dotted lines, since these portions are optional, in the sense that a test and measurement equipment adapted according to the present invention may be set to display any one or more of the different displays 640, 660 and 680, according to the choice of a user. Typically, this will be achieved by some sort of selection by a user on the device. The device may be multifunction, and therefore can be set to not display any sort of 3D depth measurement at all, and instead display parameters associated with other aspects of the broadcast transmission, such as bit rate, encoding standard in use and the like.

The next step, 650, involves determining an actual measurement value for the parallax for each pixel of the original image, by comparing the distance between features as described in more detail above. This is an estimation process, which selects the most likely fit according to user defined parameters, such as peak pixel luminance magnitude in edge extracted images.

The test and measurement device may optionally display potential candidate parallax values for a specified pixel at step 660, thus providing information to a user on the certainty of the selection, or where no selection is made, indicate why this is the case.

Once the parallax values for the whole original image (or portion thereof, if only a portion of an image is of interest) have been determined, the results are a parallax distribution for the whole image (completion of which is indicated at step 670), and this may be (optionally) displayed to a user 680, either as a histogram, or as a temperature display, as discussed above.

The parallax distribution can be assessed to determine if any estimated parallax value exceeds certain thresholds (as shown in FIG. 5), hence determining if an alarm is set off (notification step 690), indicating to a user that parallax values in the 3D image/video of interest, and hence amount of 3D depth, has exceeded some user-defined value. The alarm may be audible, visual or in some other form. Equally, the notification may be used to automatically instigate some form of automated video amendment, to reduce the perceived 3D depth. In this case, the method provides a form of 3D depth limiter, which may have particular use where the assessment is of computer generated 3D content, for which amendment of the output video is more readily achieved. The 3D depth limiter may feedback into the algorithms controlling the 3D image generation.

Figure 7:
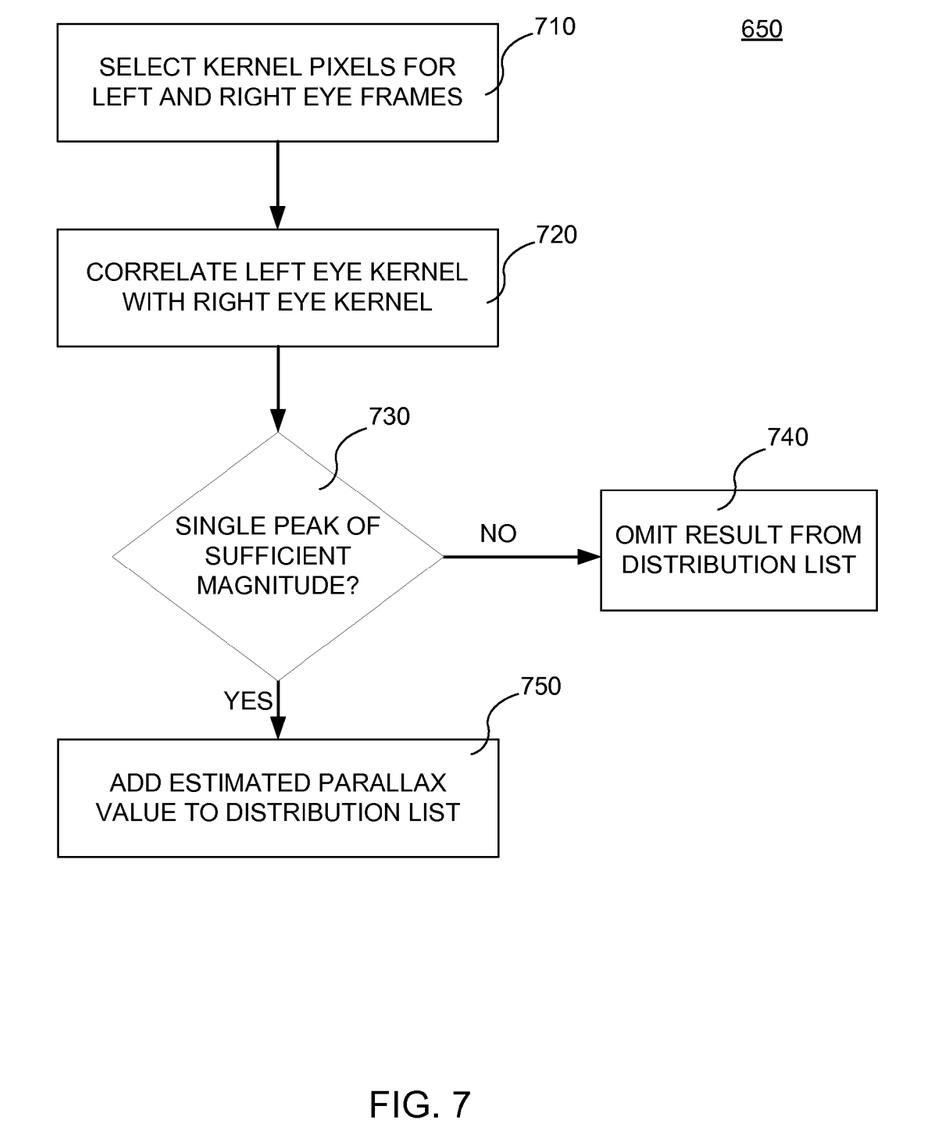
FIG. 7 shows a more detailed flow chart of the parallax estimated portion of the method of analysing 3D depth of a stereoscopic video according to an embodiment of the present invention.

FIG. 7 shows a more detailed flowchart of the method of estimating parallax at step 650.

The method of estimating parallax starts at step 710 by selecting a kernel of pixels from either of the left or right eye edge extracted images, to be compared to the search window in the other eye image.

At step 720, the kernel from the left eye edge extracted image is compared to the search window in the right eye extracted image, to determine a best fit, and hence indicate the parallax value, as described in more detail above. The search process only operates in the horizontal direction, as 3D depth is a function of horizontal separation, due to changes in angle between the left and right eyes, but vertical assessment may also be used to detect and control lens misalignment.

In each case, it is determined if there is a single peak of sufficient magnitude (step 730). If there is, the distance between the peak magnitude of the Left eye edge extracted image and that of the same feature in the right eye edge extracted image is stored in the parallax distribution list at step 750. If there is no single sufficient peak, then the parallax for that pixel is ignored, at step 740.

In the above way, only the pixels having a degree of certainty over the estimated parallax are used, therefore avoid skewed results.

Figure 8:
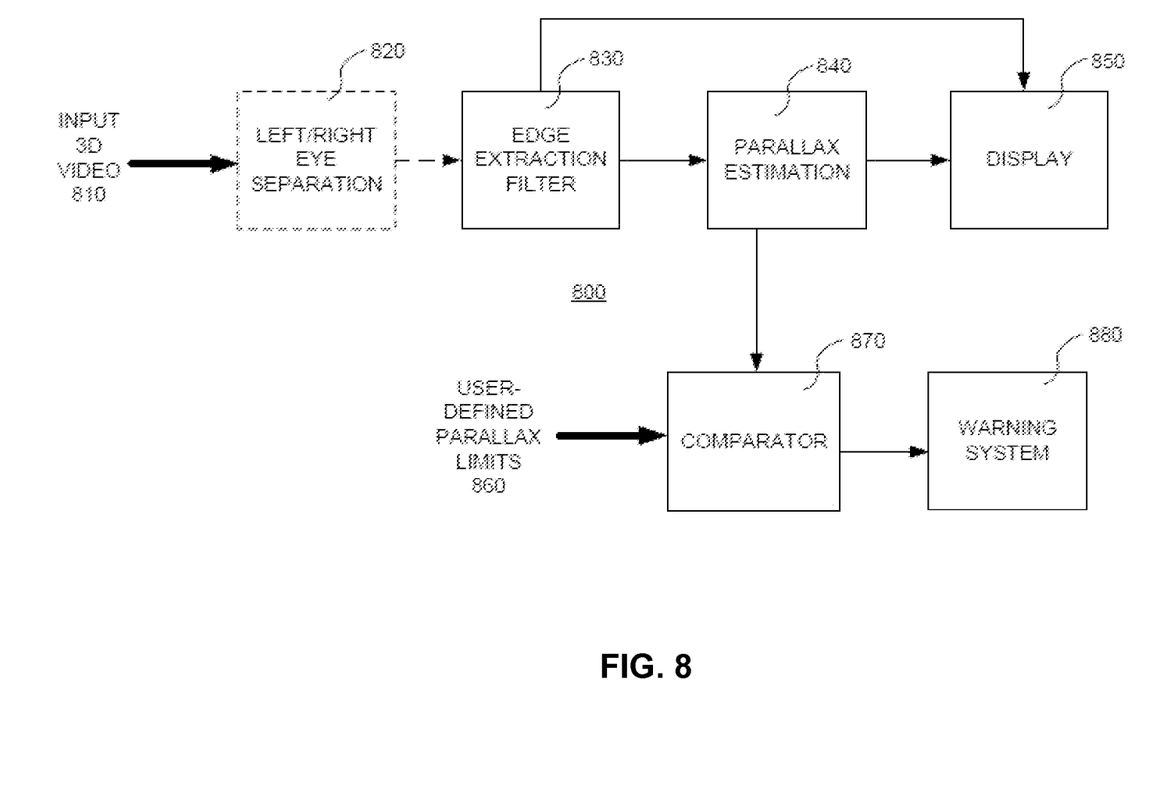
FIG. 8 shows a high level schematic diagram of apparatus for measuring 3D depth of a stereoscopic video according to an embodiment of the present invention.

FIG. 8 shows an exemplary form of hardware 800 that may be used to carry out the described method.

An input 3D image or video 810 is provided to the hardware 800. Depending on its form, the input image or video 810 may need to be separated into left and right eye video frames in separator 820.

The left and right eye video frames are then processed by edge extraction filter 830, and the superimposed results optionally displayed on Display 850.

The edge extracted left and right image frames are then used by parallax estimation unit 840, to build up a parallax distribution for the original image, which can be displayed on the Display 850.

A comparator unit 870 then takes both the result of the parallax estimation, and a set of user-defined parallax limits 860 to provide warnings to a user if certain parallax limits have been exceeded, through warning system 880. Warning system 880 may actually comprise some form on control over another system, or a feedback into any 3D depth adjustment unit (not shown).

The hardware is typically integrated into a multifunction test and measurement equipment, located in a studio, broadcast unit or other video transmission infrastructure processing 3D image and video content.

Whilst the foregoing has been described in terms of frames, it will be apparent that an essentially similar process may also be used for fields, or other groupings of pixels to be shown at the same time, such as macroblocks, slices, and the like.

The described method and apparatus are encoding format agnostic, i.e. they will work with any known, and are likely to work with any future, encoding schemes, such as, for example, MPEG-4, H.264 or VC-1 for both Standard and High Definition stereoscopic image and video data.

The above described method may be carried out by any suitably adapted or designed hardware. Portions of the method may also be embodied in a set of instructions, stored on a computer readable medium, which when loaded into a processor or computer having a Digital Signal Processor (DSP) or similar, which causes the processor or computer to carry out the hereinbefore described method.

Equally, the method may be embodied as a specially programmed, or hardware designed, integrated circuit which operates to carry out the described stereoscopic depth estimation/measurement method when loaded into said integrated circuit. The integrated circuit may be formed as part of a general purpose computing device, such as a PC, and the like, or it may be formed as part of a more specialised device, such as a hardware test and/or measurement equipment device, or the like.

One exemplary hardware embodiment is that of a Field Programmable Gate Array (FPGA) programmed to provide the described apparatus and/or to carry out the described method, the FPGA being located within a test or measurement equipment device.

Another exemplary hardware embodiment of the present invention is that of one or more Application Specific Integrated Circuits (ASICs), located within a test or measurement equipment device.

Hardware (i.e. FPGA or ASIC) implementations may be particularly beneficial when the 3D depth measurement is to happen in real time.

It will be apparent to the skilled person that the exact order and content of the steps carried out in the method described herein may be altered according to the requirements of a particular set of execution parameters, such as speed, quality, and the like. The use of averaging, to overcome spurious instantaneous measured values, is optional, and the extent of use will depend on the implementation parameters. Furthermore, it will be apparent that different embodiments of the disclosed apparatus may selectively implement certain features of the present invention in different combinations, according to the requirements of a particular implementation of the invention as a whole. Accordingly, the claim numbering is not to be construed as a strict limitation on the ability to move features between claims, and as such portions of dependent claims may be utilised freely.

The invention claimed is:

1. A method of measuring 3D depth of a stereoscopic image, comprising:
   providing left and right eye input images;
   applying an edge extraction filter to each of the left and right eye input images;
   in a processor, determining 3D depth of the stereoscopic image using the edge extracted left and right eye images including:
   selecting a kernel of pixels for comparison in one of the left or right eye edge extracted images;
   determining a most similar selection of pixels in another one of the left or right eye edge extracted images;
   correlating the selected kernel of pixels from one of the left eye edge extracted image or the right eye edge extracted image, with a range of pixels from the other one of the left or right eye edge extracted images, in which the range of pixels from the other one of the left or right eye edge extracted images comprises a search window, said search window:
   having a height equivalent to the kernel of pixels height, and a user-defined length; or
   having a user-defined height greater than the kernel of pixels height, and a user-defined length.

2. The method of claim 1, wherein the edge extraction filters are colour coded, and the method further comprises superimposing colour coded edge extracted left and right eye images onto a single screen for display to a user.

3. The method of claim 1, wherein the edge extraction filters are applied to the luminance component of each pixel in the left and right eye images.

4. The method of claim 1, further comprising determining a parallax value indicative of a depth for each pixel in a stereoscopic image.

5. The method of claim 4, wherein determining a parallax value comprises:
   providing a separation value between the relative positions of the selected kernel from one eye edge extracted image to the other eye edge extracted image.

6. The method of claim 5, further comprising determining if any determined parallax value exceeds a user defined positive or negative threshold.

7. The method of claim 5, further comprising applying at least one colour according to an amount of parallax attributed to a pixel, and displaying a colour coded greyscale version of the stereoscopic image to show parallax distribution across the stereoscopic image.

8. The method of claim 1, wherein the correlation uses an inverse of a sum of absolute differences between pixels of the left or right eye edge extracted images.

9. The method of claim 1, wherein determining a most similar selection further comprises selecting a compared position using a sufficient peak magnitude.

10. The method of claim 9, wherein if a sufficient peak magnitude is not found, then a parallax value is omitted for the pixel under test.

11. A computing device structured to perform the method of claim 1.

12. Operational monitoring equipment for use in television broadcast system testing comprising the computing device of claim 11.

* * * * *

UNITED STATES PATENT AND TRADEMARK OFFICE
CERTIFICATE OF CORRECTION

PATENT NO. : 8,542,909 B2
APPLICATION NO. : 13/081395
DATED : September 24, 2013
INVENTOR(S) : Antoni Caceres and Martin Norman

It is certified that error appears in the above-identified patent and that said Letters Patent is hereby corrected as shown below:

On the title page item (73), Assignee: "Tektronix, Inc." should be replaced with --Tektronix International Sales GmbH--

In the Specification

Column 4, line 58, the word "measurble" should be replaced with --measureable--

Signed and Sealed this
Tenth Day of December, 2013

Margaret A. Focarino
*Commissioner for Patents of the United States Patent and Trademark Office*